United States Patent
Fukuo et al.

(10) Patent No.: US 7,208,036 B2
(45) Date of Patent: Apr. 24, 2007

(54) WATER-BASED PIGMENT-CONTAINING INK COMPOSITION FOR CENTRAL CORE TYPE MARKING PEN

(75) Inventors: Hidetoshi Fukuo, Osaka (JP); Naoshi Murata, Osaka (JP); Makoto Hirotani, Osaka (JP); Tomohiro Sawa, Osaka (JP)

(73) Assignee: Sakura Color Products Corporation, Osaka-shi (JP)

( * ) Notice: Subject to any disclaimer, the term of this patent is extended or adjusted under 35 U.S.C. 154(b) by 0 days.

(21) Appl. No.: 10/482,570

(22) PCT Filed: Jul. 1, 2002

(86) PCT No.: PCT/JP02/06674

§ 371 (c)(1),
(2), (4) Date: Dec. 29, 2003

(87) PCT Pub. No.: WO03/004572

PCT Pub. Date: Jan. 16, 2003

(65) Prior Publication Data

US 2004/0173121 A1 Sep. 9, 2004

(30) Foreign Application Priority Data

| Jul. 3, 2001 | (JP) | ............................. 2001-202479 |
| Oct. 5, 2001 | (JP) | ............................. 2001-310618 |
| Mar. 6, 2002 | (JP) | ............................. 2002-060281 |

(51) Int. Cl.
    *C09D 11/16* (2006.01)
(52) U.S. Cl. ............................... 106/31.86; 106/31.65; 106/31.75; 106/31.93; 106/31.72
(58) Field of Classification Search ............ 106/31.27, 106/31.6, 31.65, 31.89, 31.86, 31.75, 31.93, 106/31.72
See application file for complete search history.

(56) References Cited

U.S. PATENT DOCUMENTS

| 4,501,870 | A  | * | 2/1985 | Kidoh et al. ............. 526/344.1 |
| 5,510,397 | A  |   | 4/1996 | Okuda et al. |
| 6,120,590 | A  | * | 9/2000 | Miyamoto et al. ......... 106/31.6 |
| 6,390,710 | B1 | * | 5/2002 | Miyamoto ................... 401/215 |
| 6,666,913 | B2 | * | 12/2003 | Hirano et al. .............. 106/31.9 |
| 6,769,827 | B2 | * | 8/2004 | Furukawa et al. .......... 401/227 |
| 6,926,765 | B2 | * | 8/2005 | Buzzetti ................... 106/31.27 |
| 2005/0143486 | A1 | * | 6/2005 | Yoshimura et al. ......... 523/160 |
| 2005/0148685 | A1 | * | 7/2005 | Yamamoto ................... 523/160 |

FOREIGN PATENT DOCUMENTS

| JP | 58-141256 | 8/1983 |
| JP | 8-310180 | 11/1996 |
| JP | 2001-11357 | 1/2001 |

* cited by examiner

*Primary Examiner*—David Sample
*Assistant Examiner*—Veronica Faison-Gee
(74) *Attorney, Agent, or Firm*—Hamre, Schumann, Mueller & Larson, PC

(57) ABSTRACT

A central core type marking pen which has an ink storage portion of a central core and a pen tip connected thereto, wherein the central core contains a water-based pigment-containing ink composition which contains a thickening agent and exhibits, at 20° C., a viscosity of not less than 45 mPa·s and not greater than 12 mPa·s when a stress of 0.01 and a stress of 10 Pa are applied, respectively.

10 Claims, 2 Drawing Sheets

WATER-BASED PIGMENT-CONTAINING INK COMPOSITION FOR CENTRAL CORE TYPE MARKING PEN

TECHNICAL FIELD

This invention relates to a water-based pigment-containing ink composition for central core type marking pens which does not generate color separation after passage of time at the time of writing and in which separation of pigments are inhibited in the central core, and therefore which is excellent in storage and writing performance.

PRIOR ART

In recent years, an ink composition for marking pens has been shifting from an ink using dyes as colorants and organic solvents as solvents to an ink using pigments as colorants and water-based solvents as solvents.

An ink composition for marking pens using pigments as colorants is excellent in toughness and in hiding power, while separation of pigments with settlement is likely to occur in the ink composition. In particular, when an ink composition is used for so-called central core type marking pens in which writing is available by letting an ink flow from an ink storage means of a body to a pen tip by capillary phenomena, with passage of time, pigments separate in a central core, causing a written mark to have gradation (color separation), and further, the ink composition gets clogged at pen tips made of felt tips or plastic molds and the like, becoming thin in writing and in some cases, even writing is impossible. In particular, this tendency is remarkable in the case of pigment inks in which white pigments such as titanium oxide and metallic powder pigments such as white pigment or aluminum pigments are included.

For example, when a metallic ink composition containing aluminum pigments is used for central core type marking pens, since a particle diameter of aluminum pigments is larger compared with ordinary pigments, aluminum pigments get clogged at a pen tip which is a fiber bundle in writing, making writing impossible. Further, since a conventional ink composition for marking pens has lower viscosity compared with ink compositions for ball-point pens, and the like, aluminum pigments are liable to settle. However, stirring an ink contained in a container is not available in marking pens having a central core structure, for example, by shaking writing instruments and the like as in pens having an ink free structure. Therefore, in central core type marking pens, an ink which has become non-uniform by a settlement of aluminum pigments cannot be restored a uniform state again and gradation in a written mark and a coated film is liable to occur. Further, when an ink is filled into a twin-type marking pen having pen tips in both upper and lower sides of a pen and is left to stand straight, gradation in a written mark becomes remarkable between upper and lower sides.

In addition, although an ink composition for central core type marking pens is manufactured by dispersing pigments and the like with known stirring devices and the like as in a production of an ink composition for central core type marking pens, dispersion is also conducted in an ink including aluminum pigments in order to obtain a uniform written mark. For this reason, in producing an ink composition, aluminum pigments are subject to physical external force including shock impact by stirring and the like. In particular, stirring under low viscosity, they are more subject to physical external force. Here, when aluminum in aluminum pigment directly reacts with water, hydrogen gas is generated and aluminum pigment loses metallic luster and it generates whitening phenomena, therefore, in order to avoid such phenomena, usually, aluminum pigment surfaces are treated with fatty acid, fatty acid salt, and inorganic phosphoric acid salt. However, aluminum pigments treated with such treatments like fatty acid, fatty acid salt, and inorganic phosphoric acid salt give way and bend due to surfactants compounded in the ink for dispersion or due to physical external forces, and since treatments used for treatment partially separate from aluminum pigment surfaces, aluminum itself is exposed in aqueous solvents. In such a case, aluminum directly reacts with water, generating hydrogen gas in a marking pen and further, aluminum pigment does not provide metallic color because aluminum on a surface changes into hydroxide. Further, sometimes additives and the like used for water-based pigment-containing ink composition for central core type marking pens are adsorbed in a fiber bundle since water-based pigment-containing ink composition for central core type marking pens is held in a fiber bundle which is an ink storage portion inside of a pen.

This invention is made in order to solve aforementioned problems present in conventional water-based pigment-containing ink composition for central core type marking pens and the object of the present invention is to provide a water-based pigment-containing ink composition for central core type marking pens which is capable of preventing pigments from separating in a central core and which is excellent in storage and writing performance without causing gradation (color separation) in a written mark, without clogging of an ink composition at a pen tip made of a felt tip or a plastic mold, and the like even when aluminum pigment in a central core settles with passage of time, and therefore without causing thin spots of a writing and even when pigments separate in a central core after a passage of time.

In particular, the object of the present invention is to provide a water-based pigment-containing metallic ink composition for central core type marking pens which include aluminum pigments, wherein said water-based metallic ink composition is capable of providing good fluidity of an ink and writing distance without causing gradation (color separation) in a written mark or in a coated film and without clogging of aluminum pigments at a pen tip containing a fiber bundle.

Further, the object of the present invention is to provide a water-based pigment-containing metallic ink composition for central core type marking pens which include aluminum pigments, wherein said water-based metallic ink composition is free from problems of hydrogen gas generation and is capable of obtaining a written mark excellent in a glittering feeling even when written after time passage.

Disclosure of the Invention

The present invention is a water-based pigment-containing ink composition for central core type marking pens the viscosity of which is not less than 45 mPa·s when the stress is 0.01 Pa and the viscosity of which is not greater than 12 mPa·s when the stress is 10 Pa at a temperature of 20° C. By this, although said ink is stored in a central core and although the pigment separates in the fiber tissue of a central core when a pen is left to stand, excellent writing performance can be realized without generating gradation in a written mark or clogging of an ink composition at a pen tip or causing thin spots in writing.

The reason is assumed to be as follows. That is, although an ink is stored in a central core and pigments separate in each cell of a capillary structure of a fiber which composes a central core when a pen is left to stand, since ink increases viscosity as above, separation of pigment can be kept low and as a result that the separation speed of a pigment becomes slow, even though pigment agglomerates and therefore separates, the separated substance of a pigment agglomerates in a state of a soft cake. On the other hand, it is assumed that when a shear force is applied to an ink, ink flows in a capillary structure of a fiber at a time of writing accompanying lowering viscosity, since said separation is not in a state of so called a hard cake, by the flow with a lowering viscosity, re-stirring of an ink in a micro level occurs in said cell and a pigment flows out in a dispersed state at a pen tip having a fiber tissue like said central core and therefore, excellent writing performance can be achieved without causing gradation in a written mark or without clogging.

Therefore, it is preferable to contain a thickening agent in an ink which is capable of adjusting the ink viscosity to said viscosity and in particular, in the present invention, it is desirable to contain at least one species of a thixotropic agent selected from polyacrylic acid, alkali metal salt thereof, poly N-vinyl acetamide-acryl polymeric copolymer, polyacrylic acid organic amine salt, and polyol as a thickening agent.

In addition, when aluminum pigment is used as a pigment, it is preferable to use aluminum pigment whose median diameter is not greater than 7 μm.

Then, it is found that when a water-based metallic ink composition for central core type marking pens comprising an aluminum pigment, a fixing resin, a thickening agent, a water-soluble organic solvent, and water, wherein a median diameter of said aluminum pigment particle is not greater than 7 μm is used, settlement of an aluminum pigment in a central core can be inhibited and even though an aluminum pigment settles with a passage of time, since a re-dispersed ink is flown out of a pen tip and clogging at a pen tip consisting of a fiber bundle does not occur, preferable ink flow and writing distance can be achieved.

In addition, the inventors of the present invention found that by using a water-based metallic ink composition for central core type marking pens comprising an aluminum pigment and a phosphoric ester surfactant, wherein said phosphoric ester surfactant is a compound of at least one species selected from the group of alkyl phosphoric acid, polyoxyethylene alkyl ether phosphoric acid and phosphoric acid salt thereof, preferable ink flow and a long writing distance can be maintained since generation of hydrogen gas can be inhibited, a glittering feeling does not change when written after passage of time, and clogging of an ink in a cell of a fiber bundle is hard to occur.

Further, the inventors of the present invention found that by using a central core type marking pens in which said ink composition is occluded in a central core whose thread density is 0.150 to 0.240 g/cm$^3$, further excellent ink flow and writing performance are developed.

Moreover, the inventors of the present invention found that by using a water-based metallic ink composition for central core type marking pens whose pH value is adjusted to 6 to 9, storage stability becomes preferable and therefore excellent ink flow and writing performance can be maintained for a long period of time.

BEST MODE FOR CARRYING OUT THE INVENTION

Figure 1:
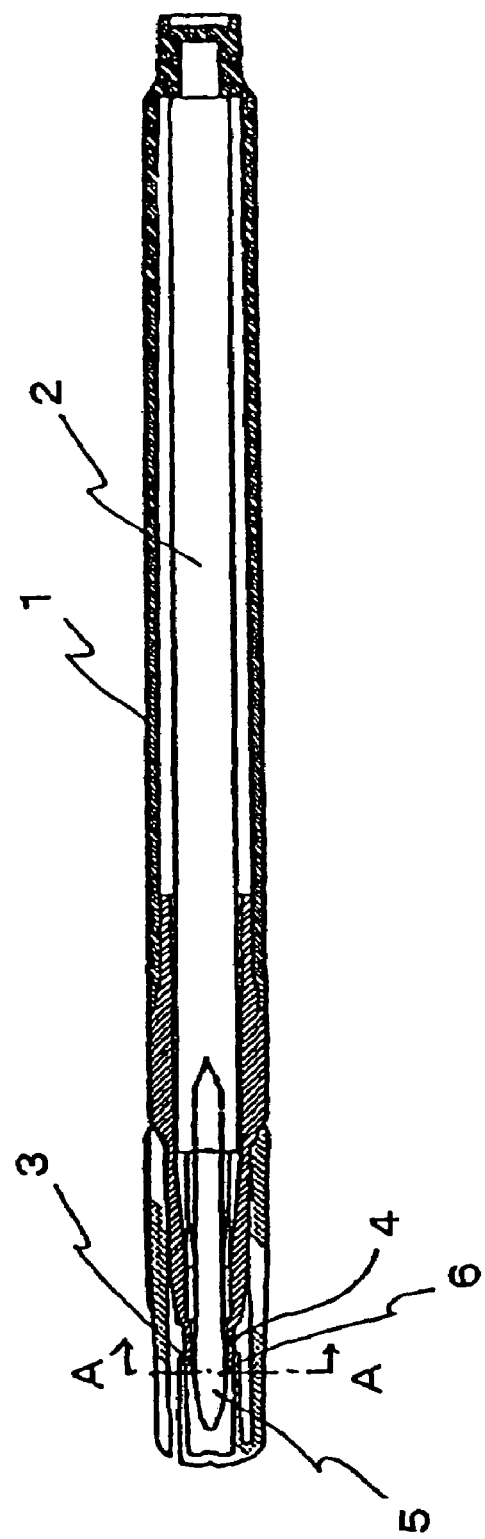
FIG. 1 is a schematic longitudinal section showing one preferable embodiment of central core type marking pens regarding the present invention.

In the present invention, central core type marking pens refer to writing instruments in which a pen tip made of a felt tip or plastic mold, and the like is provided at the end of a tube like body and an ink storage portion is provided in which an ink is pregnated in a fiber bundle, and the ink is provided utilizing capillary action from an ink storage portion to a pen tip, thereby making writing available.

A water-based pigment-containing ink composition for central core type marking pens is not specifically limited to the one. Although it usually comprises a solvent, a colorant, a fixing resin, and a thickening agent, further, as required, it comprises a hiding agent (an agent having hiding power), a wetting agent, a drying promoter, a leveling agent, and the like, and in particular, when a water-based pigment-containing ink composition is prepared as a metallic ink, metallic pigments including aluminum pigments and the like are contained.

(Thickening Agent)

An ink composition of the present invention comprises a thickening agent, in particular, a thixotropic agent and by this, a viscosity is adjusted so that a viscosity is not less than 45 mPa·s when the stress is 0.01 Pa and a viscosity is not greater than 12 mPa·s when the stress is 10 Pa.

In the present invention, as said thickening agent, usually, water soluble resin is preferably used. In particular, as a thickening agent, a thixotropic agent capable of showing aforementioned shear-rate thinning property and of inhibiting separation of a pigment depending on an ink viscosity when it is left to stand is preferable. Especially, it is important to use a thixotropic agent capable of providing a pigment with agglomerating behavior to a degree that a separation of a pigment is inhibited and even when a pigment separates, a separated substance of said pigment forms a so-called soft cake instead of forming a so-called hard cake. For information, "inhibition of a separation of a pigment" in the present invention not only means to inhibit a pigment from separating in the ink literally, but also means to inhibit a pigment from separating, making separation speed slow and preventing a separated substance of a pigment from becoming a state of a hard cake.

Therefore, a thickening agent which can be used in the present invention may be the thickening agent capable of adjusting a viscosity and of making a separation speed slow. As such thickening agents or thixotropic agents, for example, polyacrylic acid, alkali metal salt thereof, polyol, urethane modified polyol, polyacrylic acid organic amine salt, copolymer of poly N-vinyl acetamide-acrylic polymer can be used. These compounds can be used alone or in combinations of two or more of them. Further specifically, polyacrylic acid and polyacrylic alkali metal salt including lithium salt, sodium salt, and potassium salt; polyacrylic acid organic amine salt including ammonium salt, triethyl amine salt, triethanol amine salt and the like; and styrene-acryl acid copolymer, styrene-maleic acid copolymer, carboxymethyl cellulose, poly-N-vinyl acetamide, polyol, polyether and especially, various kinds of modified polyols, modified polyethers and the like can be exemplified. As polyacrylic acids, "JULIMER AC-20", "JULIMER AC-20L", and "JULIMER AC-20H" manufactured by Nihon Junyaku Co., Ltd, and "MOWIPLASXW-330" manufactured by Clariant Polymer Co. can be exemplified. As polyols, "SN Thickesner 615" manufactured by San nopuco Co can be exemplified. As urethane modified polyols, "ADEKANOL UH-752" manufactured by Asahi Denka Co., Ltd can be exemplified. As copolymers of poly-N-vinyl acetamide-acryl polymers, "PNVA GE-167L" and"PNVA GE-191LH" manufactured by Showa Denko KK can be exemplified. These thickening agents or thixotropic agents are so compounded that the obtained ink composition might have aforementioned viscosity range in the ink composition. Therefore, although the compounding amount of a thickening agent (a thixotropic agent) cannot be determined uniformly, a thickening agent or a thixotropic agent of the present invention is preferably contained in 0.01 to 20% by weight with respect to the total amount of the ink composition. When a thickening agent or a thixotropic agent is contained in less than 0.01% by weight with respect to the total amount of the ink composition, a viscosity lowers and a pigment, in particular, an aluminum pigment is liable to settle and slow settlement is hard to be obtained after passage of time. On the other hand, when a thickening agent or a thixotropic agent is contained more than 20% by weight with respect to the total amount of the ink composition, the viscosity of the ink composition becomes high and writing becomes difficult and writing performance lowers. A thickening agent or a thixotropic agent of the present invention is more preferably contained in 0.01 to 10% by weight with respect to the total amount of the water-based pigment containing ink composition. For information, when polyacrylic acid is used, suitable range of the contained amount is 0.01 to 3% by weight with respect to the ink composition and the most suitable range of the contained amount is 0.5 to 1.5% by weight with respect to the ink composition.

(Viscosity)

According to the present invention, the ink composition in which a viscosity is less than 45 mPa·s when a stress is 0.01 Pa at a temperature of 20° C. separates in a way that a pigment becomes a state of a so-called hard cake in a central core as time passes. On the other hand, the ink composition in which a viscosity is more than 12 mPa·s when a stress is 10 Pa at a temperature of 20° C. causes thin spots since an ink flow out of a pen tip made of fiber bundle tip is not good at a time of writing.

Conventionally, in many cases, a viscosity of an ink composition for marking pens is measured by a rotary viscometer, however, according to the present invention, viscosity values which inhibit aforementioned color gradation or separation of pigments cannot be found from the viscosity by a rotary viscometer. However, by particularly using an ink composition in which a viscosity is not less than 45 mPa·s when a stress is 0.01 Pa following the present invention, color gradation or separation of a pigment with a passage of time is regulated. A state in which a stress is 0.01 Pa is a state in which a stress is extremely small and that the viscosity of an ink composition is more than 45 mPa·s in this state regulates separation of a pigment, prevents pigment separation from forming a hard cake after passage of time, thereby making an ink having a re-dispersing property due to the outflow of an ink which passes through fiber tissues.

For information, when an aluminum pigment as a pigment is contained in a water-based pigment containing ink under the condition that ELD viscometer is used, and a rotor with 1° 34', R24 is used, and that the viscosity was measured at a temperature of 20° C., it is preferable that the viscosity is 3 to 12 mPa·s with a rotation speed of 50 rpm, and further, under the above measuring condition, it is preferable that the viscosity is 3 to 12 mPa·s with a rotation speed of 50 rpm and that the T.I. value (2.5 rpm/50 rpm) is not less than 1.2. When the viscosity is less than 3 mPa·s with a rotation speed of 50 rpm under said measuring condition, the ink outflow at a time of writing is too much. When the viscosity is more than 12 mPa·s with a rotation speed of 50 rpm under said measuring condition, the amount of an ink outflow at a time of writing is little. In addition, under said measuring condition, when the T.I. value (2.5 rpm/50 rpm) is less than 1.2, aluminum pigment is liable to settle. For information, said T.I. value is a value obtained by dividing the viscosity measured by an ELD viscometer, at a temperature of 20° C. using the same rotor, with a rotation speed of 2.5 rpm by the viscosity measured by an ELD viscometer, at a temperature of 20° C. using the same rotor, with a rotation speed of 50 rpm, and the viscosity at a rotation speed of 2.5 rpm is measured and the viscosity at a rotation speed of 50 rpm is measured after a passage of a certain time.

(Colorant)

According to the present invention, as colorants, chromatic colored pigments, black pigments, colored resin particles, and the like are used. As above chromatic colored pigments, black pigments, and the like, either inorganic pigments or organic pigments will do. For example, inorganic pigments including carbon black and the like, organic pigments including phthalocyanine pigments, threne pigments, azo pigments, quinacridon pigments, anthraquinone pigments, dioxane pigments, indigo pigments, thioindigo pigments, perinone pigments, perylene pigments, indolenone pigments, azomethine pigments, and further, fluorescent pigments, colored emulsions and the like can be mentioned. Further, pigment dispersion thereof or commercially available pigment dispersion can be used as said colorants. For information, as colorants, for example, water-soluble dyes (triphenyl methane, xanthane, anthraquinone, metal complex, copper phthalocyanine, and the like) such as acid dyes, direct dyes and basic dyes, and the like can be used. These colorants can be used alone or in combinations of two or more of them.

These colorants are usually contained in 1 to 50% by weight and preferably in 3 to 30% by weight with respect to the ink composition. When the amount of colorants in the ink composition exceeds 50% by weight, the viscosity of the obtained ink composition is so high that clogging is liable to occur at a pen tip at a time of writing. However, when the amount is less than 1% by weight, a written mark with practical concentration is not obtained. When colorants are used as pigment dispersion, although they are not specifically limited, for example, pigment dispersion can be obtained by adding dispersant resin to colorants, followed by dissolving adding a neutralizer, thereafter dispersing with a known device including a ball-mill and the like. As above dispersant, styrene-acryl copolymers, styrene-maleic acid copolymers, acrylic copolymers, as well as water soluble resins and the like such as alkyd, epoxy, polyester, urethane, and the like. In addition, as above neutralizers, although they are not specifically limited as far as they can be used as neutralizers, amines, ammonium, sodium hydrate, and the like are exemplified and ammonium is exemplified as preferable.

(Aluminum Pigments)

In the present invention, when a water-based metallic ink is obtained, aluminum pigment can be used. Said aluminum pigment can be used as far as it has metallic luster and good dispersibility, but in order to obtain a strong metallic feeling, scaly particles are preferably used. In addition, aluminum pigment can be used as a paste and aluminum pigment with water proof treatment on pigment particle surface is preferable. For example, aluminum pigment obtained by known methods including a method in which aluminum slices, anti friction agents including stearic acid, inorganic phosphoric acid, or the like, and proper liquid are ground with a ball mill. For information, in order to obtain a stronger glittering feeling, a paste of leafing type aluminum pigment is preferably used. However, in order to prevent clogging at a pen tip, obtain preferable ink outflow and writing distance, and let an ink easily flow out of the cell of a fiber bundle, an aluminum pigment with a median diameter of not greater than 7 μm is preferable. Further, in order to obtain a strong metallic feeling by an aluminum pigment, an aluminum pigment with a median diameter of not less than 3 μm is preferable. As aluminum pigments of the present invention, to be specific, the trade names of "Alpaste WXM 0660" (median diameter: about 4.5 μm, solid content: about 60%), "Alpaste WXMO650" (median diameter: about 5 μm, solid content: about 60%), "Alpaste WXM 0630" (median diameter: about 7 μm, solid content: about 60%), (these are leafing types and available from TOYO ALUMINIUM KK) can be used. For information, said median diameter was measured, by a laser diffraction granulometer. Although one kind of an aluminum pigment with regard to a median diameter or a shape can be used, aluminum pigments with different median diameters or shapes can be used in combinations of two or more of them. In the case of a water-based metallic ink composition comprising aluminum pigment, said aluminum pigment is preferably contained in about 0.01 to about 30% by weight in solids with respect to the total amount of the ink composition. When the content of the said aluminum pigments is less than about 0.01% by weight in solids with respect to the total amount of the ink composition, a metallic feeling (a glittering feeling) of a written mark or a coated film is hard to be obtained. On the other hand, when the content of the said aluminum pigments exceed about 30% by weight in solids with respect to the total amount of the ink composition, the solid content becomes so much that it affects viscosity and ink flow and the ink outflow from a pen tip becomes difficult. Aluminum pigment is further preferably contained in about 0.3 to about 20% by weight with respect to the total amount of the ink composition. When aluminum pigment and other colorants are used, it is preferable that said colorants do not react with aluminum pigment, said colorants do not inhibit color development of aluminum pigment and that said colorants have good solubility and dispersibility. For information, in the case of a water-based metallic ink composition comprising aluminum pigment, said colorants can be used other than said aluminum pigment. In this case, as colorants, pigments with a median diameter of not greater than 0.5 μm are preferable. Further, pigments with 90% particle diameter ($D_{90}$) is not greater than 1 μm are more preferable. This is because when a median diameter of said colorants is larger than 0.5 μm, color development of said colorants is affected and in some cases, a metallic feeling of a coated film is inhibited. Said median diameter and 90% particle diameter are measured by a dynamic light scattering granulometer. In the case of a water-based metallic ink composition comprising aluminum pigment, it is preferable that said colorants are contained in 0.05 to 15% by weight with respect to the total amount of the ink composition. When said colorants are contained in less than 0.05% by weight with respect to the total amount of the ink composition, coloring effect by colorants cannot be confirmed visually. When said colorants are contained more than 15% by weight with respect to the total amount of the ink composition, viscosity becomes so high as an ink and fluidity lowers. Further preferable amount of colorants is 0.5 to 10% by weight with respect to the total amount of the ink composition.

(Hiding Agent)

In the present invention, hiding agents (agents having hiding power) can be used. Hiding agents can be used in order to provide a written mark with hiding power (opacity). Such hiding agents include, for example, titanium oxide, a hollow resin particle, a flat resin particle, plate shaped alumina, flaky boron nitride, and the like, but are not limited to these. For information, said aluminum pigments can be used as hiding agents. However, according to the present invention, as hiding agents, titanium oxide which is a white pigment can preferably be used. Such hiding agents can usually be used within the range of 1 to 30% by weight, preferably, 2 to 15% by weight with respect to the ink. When hiding agents are contained more than 30% by weight, the viscosity of the obtained ink composition is so high that clogging is likely to occur at a pen tip when writing. However, when hiding agents are contained less than 1% by weight, the obtained ink composition has inferior hiding power. For information, hiding agents, like said colorants, can be used as dispersion which was dispersed to water beforehand using a dispersant. As dispersants, resins or surfactants including styrene-acryl acid copolymer, styrene-maleic acid copolymer, and the like can preferably be used, but dispersants are not specifically limited to them. In addition, dispersion of titanium oxide or colored resin balls can be obtained as commercially available products.

(Fixing Resin)

Further, in the ink composition of the present invention of the present invention, a fixing resin having a film forming property at a room temperature is used in order to fix a written mark to a written surface after writing on a proper written surface and water sublimation. As this fixing resin, usually, water soluble resin is used. Such water soluble resin includes water insoluble resin as an emulsion form. As fixing resin (bonding resin) which can be used in the present invention, both natural and synthetic resin can be used as far as it has a film forming function of a written mark and of a coated film. In particular, in the case of a water-based pigment-containing ink composition comprising an aluminum pigment, since aluminum pigment can be fixed firmly to coated substances, it is preferable to use said fixing resin. For information, when an aluminum pigment is used, it is preferable to use such fixing resin that does not inhibit a metallic luster by aluminum pigment and that does not affect dispersal and color development of colorants. Examples of a fixing resin which has a film forming property at a room temperature include water soluble resin including polyvinyl alcohol, polyvinyl pyrrolidone, methyl cellulose, and the like, and alkali water solution-soluble resin including alkali water solution-soluble resin of styrene-acryl acid copolymer, styrene-maleic acid copolymer made soluble by alkali metal or ammonium and the like. As aforementioned, even water insoluble resin can be used as an emulsion. Such resin emulsions include resin emulsions of vinyl acetate resin and various kinds of vinyl acetate resin copolymers, and emulsions of acrylic resin, emulsions of styrene-acryl acid copolymer, emulsions of styrene-maleic acid copolymers and the like. Especially, synthetic resin emulsion and alkali soluble resin are preferable. In particular, as said fixing resin, it is preferable to use water-based synthetic resin emulsion since a resin which is a water insoluble component forms spherical form in water and viscosity increase little to added amount. As synthetic resin emulsions, "JOHNCRYL1535" manufactured by Johnson Polymer Co, "Mowinyl 940" and "Mowinyl 942" manufactured by Clariant Polymer Co can be exemplified as styrene-acryl synthetic resin emulsions and "Nikasol TG134A" (manufactured by Nippon Carbide Industries Co., Inc.) can be exemplified as vinyl acetate synthetic resin emulsion. "JOHNCRYL 62" and "JOHNCRYL 70" manufactured by Johnson Polymer Co are exemplified as styrene acryl alkali soluble resin. "X-200", "X-220", "X-1202 S" and "X-1216" manufactured by Seiko Kagaku Kogyo Co are exemplified as styrene maleic acid alkali soluble resin.

According to the present invention, it is most suitable that these fixing resins are usually contained in 0.5 to 50% by weight, preferably 1 to 15% by weight, and further preferably 1.5 to 10% by weight with respect to the ink composition. When fixing resins are contained in more than 50% by weight, the viscosity of the obtained ink composition is so high that clogging occurs at a pen tip when writing and writing performance lowers. On the other hand, when fixing resins are contained in less than 0.5% by weight, a written mark has inferior fixability.

(Water Soluble Organic Solvent)

According to the present invention, as required, water soluble organic solvent is used as a solvent. Examples of water-soluble organic solvent include alcohols such as methanol, ethanol, and the like, glycols such as ethylene glycol, diethylene glycol, propylene glycol and the like, glycol ethers such as propylene glycol monomethyl ether and the like, or triols such as glycerin, trimethylol propane, and the like. Especially, it is preferable to use aliphatic alcohols with carbon numbers 1 to 4, propylene glycol monomethyl ether, and glycerin since they have appropriate evaporation rate. For information, water soluble organic solvents of the present invention can be used alone or in combinations of two or more of them. It is preferable that said water soluble organic solvent is contained in 0.01 to 30% by weight with respect to the total amount of the ink composition. When said water soluble organic solvent is contained in less than 0.01% by weight with respect to the total amount of the ink composition, a pen tip is likely to dry and also, an ink is liable to be frozen. When said water soluble organic solvent is contained in more than 30% by weight with respect to the total amount of the ink composition, solubility of water soluble thickening resin is affected and a written mark and a coated film becomes hard to dry. It is further preferable that the water soluble organic solvent is contained in 0.5 to 20% by weight with respect to the total amount of the ink composition.

(Water)

According to the present invention, water can be used as a solvent. Although the amount of water is not specifically limited, usually the range is within 50 to 90% by weight and preferably 60 to 80% by weight.

(Phosphoric Ester Surfactant)

In the case of a water-based pigment-containing metallic ink composition for central core type marking pens of the present invention comprising an aluminum pigment, it is preferable to use a phosphoric ester surfactant. Phosphoric ester surfactant is a compound of at least one species selected from the group which consists of alkyl phosphoric acid, polyoxyethylene alkyl ether phosphoric acid and phosphoric acid salt thereof. Although it is not decisive, it is assumed that phosphoric acid surfactant is more advantageous compared with other surfactants since phosphoric acid surfactant is excellent in a glittering feeling with time passage and clogging in a cell of a fiber bundle is less likely to occur since phosphoric ester surfactant has weaker polarity and mild, and in addition, it is excellent in dispersibility with time passage due to prevention of agglomeration and repulsion of surfactants. By this, preferable ink flow and a long writing distance can be maintained.

As said alkyl phosphoric acid or alkyl phosphoric acid salt, it is preferable to use either monoalkyl phosphoric acid ester or monoalkyl phosphoric acid ester salt as represented by the following formula (1) or dialkyl phosphoric acid ester or dialkyl phosphoric acid ester salt as represented by the following formula (2). As polyoxyethylene alkyl ether phosphoric acid or polyoxyethylene alkyl ether phosphoric acid salt, it is preferable to use mono polyoxyethylene alkyl ether phosphoric acid or mono polyoxyethylene alkyl ether phosphoric acid salt in which polyoxyethylene chain is one compound represented by the following formula (3). Since in the compound of the formulae (1), (2), and (3), a main hydrophilic portion is an oxygen ion of phosphoric acid group generated by ionization, an oxygen ion which is anion is likely to selectively orient itself on a metal surface of an aluminum pigment, even when the amount is comparatively little, generation of hydrogen gas can effectively be inhibited and can easily prevent a surface of an aluminum pigment from whitening.

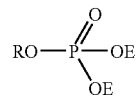

Chemical formula 1

(E is hydrogen or Lewis acid of metal ion, ammonium ion, and the like)

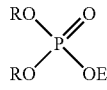

Chemical formula 2

(E is hydrogen or Lewis acid of metal ion, ammonium ion, and the like)

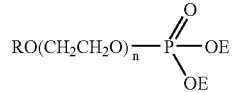

Chemical formula 3

(E is hydrogen or Lewis acid of metal ion, ammonium ion, and the like)

Although said monoalkyl phosphoric acid ester or monoalkyl phosphoric acid ester salt may be used alone, it may be used as a mixture of dialkyl phosphoric acid ester or dialkyl phosphoric acid ester salt. Since monoalkyl phosphoric acid ester or monoalkyl phosphoric acid ester salt is liable to be a mixture of dialkyl phosphoric acid ester or dialkyl phosphoric acid ester salt which is a byproduct at a time of manufacturing by a usual manufacturing method, it is preferable that monoalkyl phosphoric acid ester or monoalkyl phosphoric acid ester salt is used as a mixture of dialkyl phosphoric acid ester or dialkyl phosphoric acid ester salt since isolation and the like are not required. As mixtures of dialkyl phosphoric acid ester or dialkyl phosphoric acid ester salt and monoalkyl phosphoric acid ester or monoalkyl phosphoric acid ester salt, known mixtures can be exemplified and for example, as a mixture of dialkyl phosphoric acid ester and monoalkyl phosphoric acid ester, a trade name "PHOSPHANOL RE-610" can be exemplified, but is not specifically limited to this. Further, as polyoxyethylene alkyl ether phosphoric acid or polyoxyethylene alkyl ether phosphoric acid salt, for example, "PHOSPHANOL RZ720" (HLB=14.4,sodium salt, manufactured by Toho Kagaku Kogyo KK) can be exemplified. The HLB value of said phosphoric ester surfactant is not less than 10 since it is necessary that hydrophilic portion of said phosphoric ester surfactant contacts with an aluminum pigment in water and that said phosphoric ester surfactant is present as a molecule which is uniformly dissolved, and that said phosphoric ester surfactant is selectively adsorbed on a metal surface of an aluminum pigment rather than a fiber bundle which is an ink storage portion. Further, it is preferable that said phosphoric acid ester surfactant is selected from monoalkyl phosphoric acid ester and monoalkyl phosphoric acid ester salt represented by a formula (1) which is a compound providing two ionic functional groups or from mono polyoxyethylene alkyl ether phosphoric acid and salt thereof represented by a formula (3). By using a compound providing two ionic functional groups, phosphoric ester surfactant is more selectively adsorbed in a metal surface of an aluminum pigment compared with using a compound providing one ionic functional group.

It is preferable that said phosphoric acid ester surfactant is a salt which is a neutralizer with a base from the view point of easy dissolution at a time of manufacturing. Cations which form a pair with an oxygen atom of phosphoric acid are not specifically limited and a metal ion such as sodium ion, potassium ion, magnesium ion, and the like as well as ammonium ion or organic base ion can be exemplified and monovalent cation or bivalent cation can be used, however, sodium ion and/or potassium ion is preferable due to easy dissociation of ions. Further, although the amount of said phosphoric ester surfactant to be compounded is not specifically limited, the amount is preferably 0.01 to 3.0% by weight and more preferably 0.1 to 1.0% by weight. When said amount is less than 0.01% by weight with respect to the total amount of the ink composition, the effect of inhibiting gas generation lowers and a glittering feeling of a written mark written after passage of time lowers. On the other hand, when said amount exceeds 3.0% by weight with respect to the total amount of the ink composition, since surface tension lowers as a water-based ink composition, ink leakage out of a pen tip is liable to occur and color development degrades when an absorption surface is made to be a coated substance and fixability to a coated substance lowers, too. Although said phosphoric ester surfactant can be used alone, said phosphoric ester surfactant can also be used in combinations with two or more of them.

(Others)

Further, as required, leveling agents can be used. As leveling agents, surfactants are preferably used. Examples of such surfactants include sodium dialkyl sulfosuccinate acid ester (for example, Neokol YSK manufactured by Daiichi Kogyo Seiyaku Co.), sodium alkyl sulfosuccinate acid (for example, Nopuco Wet 50 manufactured by San Nopuco Co), perfluoro alkyl ethylene oxide additive (for example, UNI-DYNE DS-401 manufactured by Daikin Industries Ltd.), and the like. In addition, as required, in the ink composition of the present invention, pH adjusters such as caustic soda and the like, anti rusting agents, antiseptic mildew proofing agents, dye solubilizing agents, anti foaming agents, and the like.

(Preparation Method)

Although the preparation method of the ink composition of the present invention is not specifically limited, the ink composition of the present invention can be obtained, for example, by stirring pigment dispersion followed by adding hiding agents as required and adjusting pH, thereafter adding fixing resin, thickening agents (thixotropic agents) and others as required and string.

In addition, although the preparation method of the ink composition of the present invention comprising an aluminum pigment is not specifically limited, it is preferable to prepare by the following method. First, an aluminum pigment is dispersed mechanically to water without using any dispersant, followed by mixing with thickening agents (thixotropic agents), water soluble organic solvents, and other additives as required and stirring. Next, pH of this mixed solution is adjusted as required, followed by adding colorants and fixing resin and stirring. For information, in such preparation, known method of dispersion, of defoaming, and of filtering can be employed. In particular, it is preferable that said phosphoric acid ester surfactant used in the present invention is dissolved in the process where an aluminum pigment is dispersed in the main solvent (water) of said water-based metallic ink composition. It is preferable that said phosphoric acid ester surfactant is dissolved when an aluminum pigment is dispersed in the main solvent (water) since coated portions such as aliphatic acid and the like on said aluminum pigment surface are damaged by a physical force such as impact shocks by stirring and the like when said aluminum pigment is dissolved in water which is the main solvent of water-based metallic ink composition at a time of preparing water-based metallic ink composition. For information, regarding the dissolution of said phosphoric acid ester surfactant in the process where aluminum pigment is dispersed in the main solvent (water) of said water-based metallic ink composition, either of the following can be employed, that is, said phosphoric acid ester surfactant is dissolved in water which is a main solvent, followed by putting an aluminum pigment, stirring and dispersing; or an aluminum pigment is put in water which is the main solvent and is stirred and dispersed, followed by dissolving said phosphoric ester surfactant. When said phosphoric acid ester surfactant is used, to be specific, it is preferable to prepare by the following method. First, an aluminum pigment and phosphoric acid ester surfactant are put in water and dispersed, followed by mixing with a thickening agent (thixotropic agent), water soluble organic solvent, and other additives as required and stirring. Next, after adjusting the pH value of this mixture liquid, colorants and bonding resin are added thereto followed by stirring. For information, in such preparation, known method of dispersion, of defoaming, and of filtering can be employed. In addition, although colorants are not specifically limited, for example, pigment dispersion with a median diameter of 0.08 μm and with solid content concentration of 10% by weight obtained by adding NaOH to phthalocyanine blue and styrene-acryl copolymer with a weight ratio of 5 to 1 and stirring, followed by dispersing with a ball mill can be used.

(Central Core Type Marking Pen)

The ink composition of the present invention is applied to a central core type marking pen. A central core type marking pen pertaining to the present invention is a marking pen which is stored in a central core of a fiber bundle more preferably having a thread density of 0.150 to 0.240 g/cm$^3$. By this, said marking pen has preferable ink flow and a writing distance and no gradation occurs in a written mark or a coated film. When a thread density of a central core is less than 0.150 g/cm³, storage stability lowers and gradation is liable to occur in a written mark or a coated film. On the other hand, when a thread density of a central core exceeds 0.240 g/cm³, ink flow at a time of writing degrades.

Although said central core type marking pen can be used as far as it is a central core type marking pen which provides known structure, to be specific, for example, such a marking pen can be used that provides a central core in which a fiber bundle is gathered by an outer covering and a pen tip which is a ground fiber bundle solidified by a resin and said central core (ink storage portion) and capable of storing an ink and said tip are connected and an ink is filled in a pen tip by a capillary action by said fiber of said central core and by a fiber of said pen tip. A material for fiber bundle used for said central core or a pen tip is not specifically limited. As a material for a central core, examples include known resin fiber such as acrylic resin fiber, polyester resin fiber, acetate, polypropylene, and the like. As a material for a pen tip, examples include a felt pen tip made mainly of wool, a fiber core in which a fiber bundle such as acrylic resin or polyester resin is solidified by a resin, or a plastic core such as using polyacetal, fluorocarbon resin, or nylon resin. Further, a material for an outer covering which gathers a fiber bundle of said central core and for a resin which solidifies a fiber bundle of said pen tip is not specifically limited, and known resin can be used. For information, it is preferable that a central core is a fiber bundle made of polyester, since storage of an ink and adjustment of coating amount gets easy due to the excessively highly porous state. In addition, it is preferable that said pen tip has a fiber bundle made of acrylic resin due to preferable durability and fitness to a writing with a long distance. In particular, when a central core type marking pen is made up of a central core made of a fiber bundle of polyester and a pen tip in which acrylic resin fiber is solidified by a resin, a thickening ink due to said thixotropic property can be preferably stored by a capillary structure of said fiber of a central core made up of said polyester fiber bundle. And that, since acrylic fiber is arranged which is harder than polyester fiber at a pen tip, a capillary structure of this relatively hard fiber satisfactorily secures a discharge canal of an ink with thinning viscosity due to said thixotropy property up to a written surface resisting against a force applied to a pen tip at a time of writing, thereby enabling shear-rate thinning property easily to develop and making said stored ink from a central core of a fiber bundle of said polyester fiber bundle easily absorbed. Therefore, particularly, even in the case of a water-based metallic ink composition comprising an aluminum pigment with a median diameter of maximum 7 μm, separation of pigment can be regulated due to thickening viscosity and can prevent a separated substance from becoming a hard cake after passage of time, and at a time of writing, shear force is applied to an ink and when the viscosity lowers, ink is re-dispersed in a fiber structure, thereby preferably flowing out from a central core to a written surface and the like through a tip. As a specific central core type marking pen, for example, a specific central core type marking pen having an ink storage portion of said central core and a pen tip connected thereto, wherein a thickening agent (thixotropic agent) is contained in said central core and a water-based ink whose viscosity is not less than 45 mPa·s when a stress is 0.01 Pa and whose viscosity is not greater than 12 mPa·s when a stress is 10Pa at a temperature of 20° C. is contained is preferable.

Further, for example, a central core type marking pen having an ink storage portion of said central core and a pen tip connected thereto, wherein an ink comprising the following components is contained in said central core, and the viscosity of said ink is not less than 45 mPa·s when a stress is 0.01 Pa and the viscosity of said ink is not greater than 12 mPa·s when a stress is 10Pa at a temperature of 20° C. is preferable.

(a) a colorant
(b) an agent having hiding power
(c) a fixing resin
(d) a thickening agent
(e) a solvent And in particular, as a central core type marking pen realizing a metallic color on a written surface, a central core type marking pen having an ink storage portion of said central core and a pen tip connected thereto, wherein an ink comprising the following components is occluded in said central core is preferable.

(a) an aluminum pigment with a median diameter of not greater than 7 μm
(b) a fixing resin
(c) a thickening agent
(d) a water soluble organic solvent
(e) water In particular, instead of using above components, a central core type marking pen in which an ink comprising the following components is occluded in said central core is further preferable.

(a) an aluminum pigment with a median diameter of not greater than 7 μm
(b) a colorant
(c) a fixing resin
(d) a thickening agent
(e) phosphoric acid ester surfactant
(f) water soluble organic solvent
(g) water For information, as further preferable central core type marking pen, a central core type marking pen having an ink storage portion of said central core and a pen tip connected thereto and providing a written mark with a metallic tone, wherein said central core is made up of a fiber bundle of polyester, said pen tip is a fiber bundle of acryl, the following ink composition is contained in said central core, the viscosity of said ink is 3 to 12 mPa·s at a rotation speed of 50 rpm and the T.I value (2.5 rpm/50 rpm) is not less than 1.2.

Figure 2:
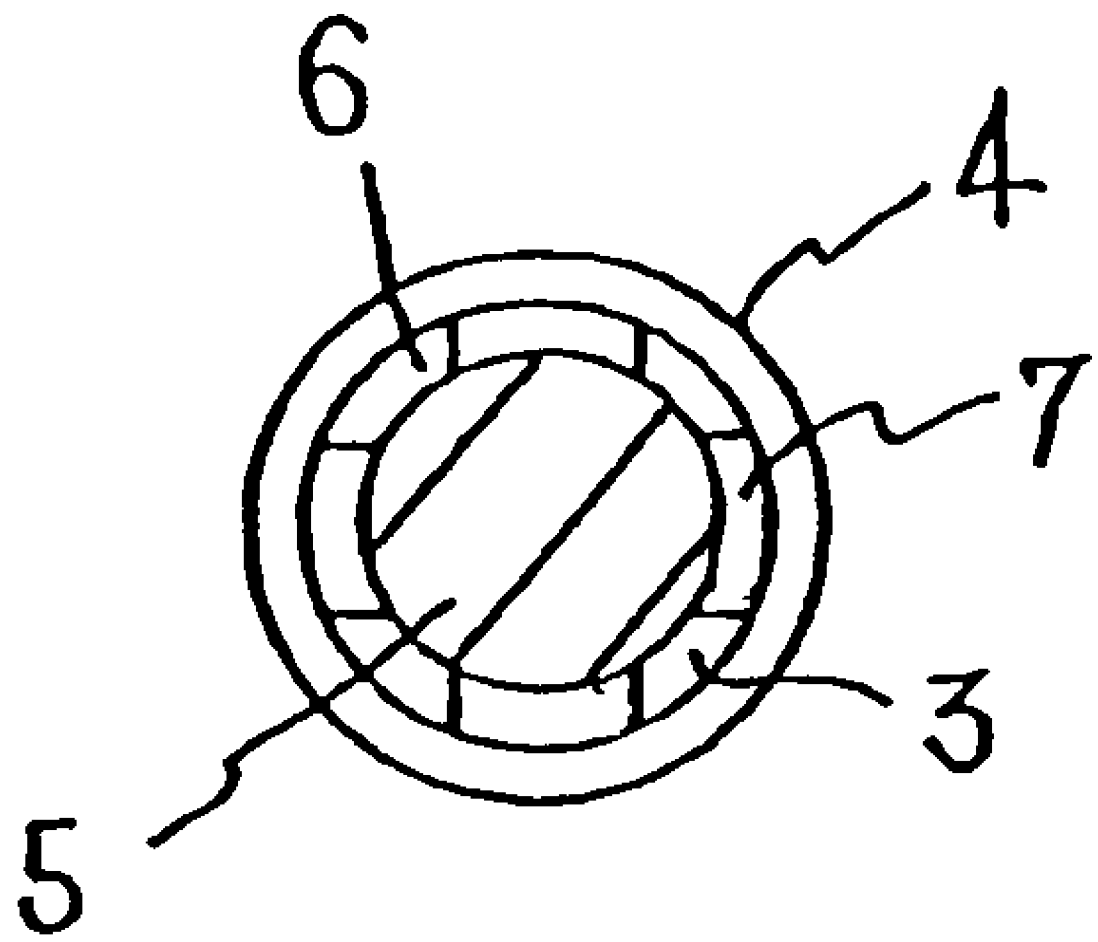
FIG. 2 is a schematic section taken the A—A line.

(a) an aluminum pigment on whose pigment particle surface is treated with said water resistant treatment and whose median diameter of not greater than 7 μm
(b) a colorant
(c) a fixing resin
(d) a thickening agent
(e) phosphoric acid ester surfactant
(f) water soluble organic solvent
(g) water For information, a further preferable specific central core type marking pen, as shown in FIGS. 1 and 2, is a central core type marking pen in which an ink storage portion 2 of a central core contained in a pen holder body 1 is connected to an ink storage portion 2 of said central core and which provides a pen tip 5 held in a socket portion 4 at an end portion of a pen holder body 1 having an end opening portion 3. And said pen tip 5 is held in a socket portion 4 securing an air vent 6 in a state of not closing said end opening portion 3 of a pen holder body 1. As a means to secure an air vent 6 in a state of not closing said end opening portion 3 of a pen holder body 1, for example, it can be achieved by providing a projection 7 which holds said pen tip in an inner wall of a socket portion 4. For information, when an ink is occluded in a central core, although in general, said ink can directly be occluded in a central core, in the case of an ink pigment of the present invention, particularly in the case of an aluminum pigment which slowly settles in the ink after time passage, it is preferable to stir mechanically to disperse said ink, followed by letting this occlude in a central core. By this, an ink which was dispersed once is stored in a cell of a fiber structure of a central core. By this, separation of a pigment slowly occurs inside of each cell of said fiber structure in a micro level and when an ink decreases its viscosity at a time of writing, an ink is re-dispersed when said ink flows out to a pen tip moving inside of a fiber structure, resulting in a formation of a written mark or a coated film without color gradation.

EXAMPLE

Although the present invention is explained as follows citing examples, the present invention is not specifically limited to these examples. In the following examples and comparative examples, component amount is shown by weight percent and the remaining portion is water.

| Comparative Example 1 | |
|---|---|
| Coloring resin particle dispersion (solid content 55%)[1] | 45.0 |
| Titanium oxide dispersion[2] | 5.0 |
| Fixing resin (styrene-acryl acid copolymer)[3] | 5.0 |
| Thickening agent (polyacrylic acid[4]) | 1.0 |
| Leveling agent (acetylene glycol[5]) | 0.5 |
| Ethylene glycol | 3.0 |
| Antiseptic mildew proofing agent | 0.3 |
| Example 1 | |
| Coloring resin particle dispersion[1] | 45.0 |
| Titanium oxide dispersion[2] | 5.0 |
| Fixing resin (styrene-acryl acid copolymer)[3] | 5.0 |
| Thickening agent (polyacrylic acid[4]) | 3.0 |
| Leveling agent (acetylene glycol[5]) | 0.5 |
| Ethylene glycol | 3.0 |
| Antiseptic mildew proofing agent | 0.3 |
| Example 2 | |
| Phthalocyanine blue dispersion (solid content 10%)[6] | 25.0 |
| Titanium oxide dispersion | 15.0 |
| Fixing resin (styrene-acryl acid copolymer) | 2.0 |
| Thickening agent (polyacrylic acid[4]) | 4.0 |
| Leveling agent (acetylene glycol[5]) | 0.5 |
| Ethylene glycol | 3.0 |
| Antiseptic mildew proofing agent | 0.3 |
| Example 3 | |
| Coloring resin particle dispersion | 40.0 |
| Titanium oxide dispersion | 10.0 |
| Fixing resin (styrene-acryl acid copolymer) | 5.0 |
| Thickening agent (urethane polyol[7]) | 2.0 |
| Leveling agent (acetylene glycol) | 0.5 |
| Ethylene glycol | 3.0 |
| Antiseptic mildew proofing agent | 0.3 |
| Comparative Example 2 | |
| Coloring resin particle dispersion | 45.0 |
| Titanium oxide dispersion | 5.0 |
| Fixing resin (styrene-acryl acid copolymer) | 5.0 |
| Thickening agent (xanthane gum) | 0.1 |
| Leveling agent (acetylene glycol) | 0.5 |
| Ethylene glycol | 3.0 |
| Antiseptic mildew proofing agent | 0.3 |
| Comparative Example 3 | |
| Phthalocyanine blue dispersion | 25.0 |
| Titanium oxide dispersion | 15.0 |
| Fixing resin (styrene-acryl acid copolymer) | 2.0 |
| Thickening agent (xanthane gum) | 0.1 |

| -continued | |
|---|---|
| Leveling agent (acetylene glycol[5]) | 0.5 |
| Ethylene glycol | 3.0 |
| Antiseptic mildew proofing agent | 0.3 |
| Comparative Example 4 | |
| Coloring resin particle dispersion | 45.0 |
| Titanium oxide dispersion | 5.0 |
| Fixing resin (styrene-acryl acid copolymer) | 5.0 |
| Thickening agent (urethane polyol) | 4.5 |
| Leveling agent (acetylene glycol) | 0.5 |
| Ethylene glycol | 3.0 |
| Antiseptic mildew proofing agent | 0.3 |

(Note)
[1] LUMICOL NKW-2104 manufacture by Nihon Keiko Kagaku Co., Ltd.
[2] ammonia water was added to 55 parts by weight of titanium oxide and 9 parts by weight of styrene-acryl acid copolymer thereby dissolving styrene-acryl acid copolymer, followed by dispersing with a ball mill, thereby obtaining titanium oxide dispersion with solid content (titanium oxide) concentration of 65% by weight.
[3] JOHNCRYL 62 manufactured by Johnson Polymer Co
[4] MOWIPLAS XW-330 (solid content 30% by weight) manufactured by Clariant Polymer Co
[5] Surfynol 104 H manufactured by NISSIN CHEMICAL INDUSTIRES CO., LTD
[6] NaOH solution was added to 5 parts by weight of phthalocyanine blue and 1 part by weight of styrene-acryl acid copolymer thereby dissolving styrene-acryl acid copolymer, followed by dispersing with a ball mill, thereby obtaining pigment dispersion with an average particle diameter of 0.08 μm. Solid content concentration was adjusted to 10% by weight.
[7] ADEKANOL UH-752 manufactured by Asahi Denka Co., Ltd
[8] Kelzan by Sansho Co., Ltd.

When the above ink compositions of examples were left, with a passage of time, the ink compositions agglomerated and slowly separated. The separation was not a hard cake type and could be re-dispersed. By this, the separation of a pigment to form a hard cake could be prevented. The following tests were conducted using test marking pens by filling an ink composition obtained in the examples and comparative examples in a central core made up of a fiber bundle with a thread density of 0.185 g/cm³ followed by attaching a felt tip as a pen tip. The result is shown in the table 1.

(Storage Stability)

After storage for 1 month with a pen tip up, down, or horizontal at a temperature of 50° C., rating criteria were set as follows: ○ for concentration of a written mark without change before the storage; X for concentration of a written mark with change before the storage.

(Writing Performance)

Writing was conducted under a condition of at a room temperature, with a loading of 50 g and with a writing angle of 65° and with a writing speed of 20 cm/sec and rating criteria were set as follows: ○ for a normal written mark; X for a written mark with thin spots.

(Viscosity Measurement Under Stress)

CS-flow curve was measured using viscometer RS75 manufactured by Haake Co. under the condition of DG41AL rotor at a temperature of 20° C.

(Viscosity Measurement by E Type Rotational Viscometer)

Viscosity was measured using ELD, E type viscometer manufactured by TOKIMEC INC, when a rate of shear D is 10 $_{S-1}$ (shear viscosity measured by 1° 34'R24 cone at a rotation speed of 2.5 rpm) and when a rate of shear D is 200 $_{S-1}$ (shear viscosity measured by 10° 34'R24 cone at a rotation speed of 50 rpm) at a temperature of 20° C.

TABLE 1

(amount: wt %)

|  | Comparative Example 1 | Example 1 | Example 2 | Example 3 | Comparative Example 2 | Comparative Example 3 | Comparative Example 4 |
|---|---|---|---|---|---|---|---|
| Viscosity under stress (20° C. mPa · s) | | | | | | | |
| Stress τ = 0.01 Pa | 13 | 470 | 1400 | 130 | 30 | 40 | 700 |
| Stress τ = 10 Pa | 7.2 | 9.0 | 9.5 | 9.5 | 9.5 | 10.0 | 13.0 |
| Viscosity measured by E-rotational viscometer (20° C. mPa · s) | | | | | | | |
| Shear rate D = $10_{s-1}$ | 7.5 | 24.0 | 28.0 | 19.5 | 24.0 | 26.0 | 45.0 |
| Shear rate D = $200_{s-1}$ | 2.5 | 11.7 | 10.5 | 10.0 | 11.5 | 12.5 | N.A |
| Writing performance | ○ | ○ | ○ | ○ | ○ | ○ | X |
| Storage stability | X | ○ | ○ | ○ | X | X | ○ |

As shown in Example, in the ink composition the viscosity of which is not less than 45 mPa·s when a stress is 0.01 Pa and the viscosity of which is not greater than 12 mPa·s when a stress is 10 Pa at a temperature of 20° C., pigment separation is inhibited by an ink viscosity in a central core even after passage of time and color gradation does not occur at a time of writing. Further, writing performance is also good.

On the other hand, as shown in Comparative Examples, even though the viscosity measured by an E type rotational viscometer is substantially the same as that in the Examples, in the ink composition the viscosity of which is out of the range defined in the present invention when a stress is 0.01 Pa or 10 Pa, a pigment separates in the central core after passage of time, color gradation occurs at a time of writing, and a writing performance is bad.

Examples 4 to 23

Next, with a composition and a compounding amount (parts by weight) as shown in tables 2 or 3, by a method of producing a water-based metallic ink composition for central core type marking pens, a water-based metallic ink composition of Examples 4 to 23 was obtained. When this ink was left to stand, with a passage of time, an aluminum pigment agglomerated and slowly separated. The separated substance was not in a state of a hard cake, and it could be re-dispersed. By this, settlement of an aluminum pigment forming a hard cake was prevented.

Comparative Examples 5 to 8

A water-based pigment-containing ink composition for central core type marking pens of comparative examples 5 to 8 was obtained in the same manner as Example except for using the compositions and amounts (parts by weight) given in Tables 4. For information, in the Examples 3 to 23 and in the Comparative Examples 5 to 8, conventionally known method was employed concerning dispersing method, degassing method, and filtering, and the like.

TABLE 2

(amount: wt %)

|  |  | Example | | | | | | | | | |
|---|---|---|---|---|---|---|---|---|---|---|---|
|  |  | 4 | 5 | 6 | 7 | 8 | 9 | 10 | 11 | 12 | 13 |
| Aluminum pigment | I | 10.0 |  | 5.0 | 6.0 | 10.0 | 10.0 | 10.0 | 10.0 | 10.0 |  |
|  | II |  | 10.0 | 5.0 |  |  |  |  |  |  | 10.0 |
|  | III |  |  |  |  |  |  |  |  |  |  |
| Bonding resin | I | 10.0 | 10.0 | 10.0 | 10.0 | 10.0 | 0.4 | 30.0 | 10.0 | 10.0 | 10.0 |
|  | II | 5.0 | 5.0 | 5.0 | 5.0 | 5.0 |  |  | 5.0 | 5.0 | 5.0 |
| Thickening agent (Thixotropic) | I | 5.0 | 5.0 | 5.0 | 2.0 |  | 5.0 | 2.0 | 10.0 | 5.0 | 5.0 |
|  | II |  |  |  | 0.5 | 1.0 |  |  |  |  |  |
| Water soluble organic solvent |  | 5.0 | 5.0 | 5.0 | 5.0 | 5.0 | 5.0 | 5.0 | 5.0 | 5.0 | 5.0 |
| Colorant |  | 10.0 | 10.0 | 10.0 | 10.0 | 10.0 | 10.0 | 10.0 | 10.0 | 10.0 | 10.0 |
| Antiseptic mildew proofing agent |  | 0.5 | 0.5 | 0.5 | 0.5 | 0.5 | 0.5 | 0.5 | 0.5 | 0.5 | 0.5 |
| Surfactant | A(Phosphoric aid ester) |  |  |  |  |  |  |  |  |  |  |
|  | B(Phosphoric aid ester) |  |  |  |  |  |  |  |  |  |  |
|  | C(Phosphoric aid ester) |  |  |  |  |  |  |  |  |  |  |
|  | D(Polyoxyethylene alkyl ether sulfuric |  |  |  |  |  |  |  |  |  |  |

TABLE 2-continued (amount: wt %)

| | | Example | | | | | | | | | |
|---|---|---|---|---|---|---|---|---|---|---|---|
| | | 4 | 5 | 6 | 7 | 8 | 9 | 10 | 11 | 12 | 13 |
| | acid salt) | | | | | | | | | | |
| | E (Disulfonic acid salt) | | | | | | | | | | 0.3 |
| Water | | 54.5 | 54.5 | 54.5 | 61.0 | 58.5 | 69.1 | 42.5 | 53.5 | 54.5 | 54.5 |
| Total | | 100.0 | 100.0 | 100.0 | 100.0 | 100.0 | 100.0 | 100.0 | 100.0 | 100.0 | 100.0 |
| Viscosity under stress (20° C. mPa · s) | | | | | | | | | | | |
| Stress $\tau$ = 0.01 Pa | | 2100 | 2100 | 2100 | 1400 | 250 | 300 | 550 | 330 | 2100 | 2100 |
| Stress $\tau$ = 10 Pa | | 7.5 | 7.5 | 7.5 | 6.0 | 8.0 | 6.0 | 9.0 | 9.0 | 7.5 | 7.5 |
| Viscosity by E rotational (20° C. mPa · s) Shear rate $D = 200_{s-1}$ (50 rpm) | | 8.5 | 8.5 | 8.5 | 6.5 | 9.5 | 6.5 | 9.0 | 9.0 | 8.5 | 8.5 |
| T. I. Value | | 1.6 | 1.6 | 1.6 | 1.4 | 1.5 | 1.4 | 1.6 | 4.0 | 1.6 | 1.6 |
| Thread density of central core(g/cm³) | | 0.185 | 0.185 | 0.185 | 0.185 | 0.185 | 0.185 | 0.185 | 0.185 | 0.15 | 0.1 |
| Writing performance | | ◉ | ◉ | ◉ | ◉ | ◉ | ○ | ○ | ○ | ◉ | ◉ |
| Storage stability | | ○ | ○ | ○ | ○ | ○ | ○ | ○ | ○ | ○ | △ |
| Fixability | | ◉ | ◉ | ◉ | ◉ | ◉ | ○ | ◉ | ◉ | ◉ | ◉ |
| Glittery with time | | X | X | X | X | X | X | X | X | X | X |
| Inhibition of gas generation | | X | X | X | X | X | X | X | X | X | X |

TABLE 3

(amount: wt %)

| | | Example | | | | | | | | | |
|---|---|---|---|---|---|---|---|---|---|---|---|
| | | 14 | 15 | 16 | 17 | 18 | 19 | 20 | 21 | 22 | 23 |
| Aluminum pigment | I | 5.0 | 10.0 | 10.0 | 10.0 | 10.0 | 10.0 | 10.0 | 10.0 | 10.0 | 10.0 |
| | II | 5.0 | | | | | | | | | 10.0 |
| | III | | | | | | | | | | |
| Bonding resin | I | 10.0 | 10.0 | 10.0 | 10.0 | 10.0 | 10.0 | 10.0 | 10.0 | 5.0 | |
| | II | 5.0 | 5.0 | 5.0 | 5.0 | 5.0 | 5.0 | 5.0 | 5.0 | | |
| | III | | | | | | | | | 5.0 | 10.0 |
| Thickening agent (Thixotropic) | I | 5.0 | 2.0 | | | | | | | 5.0 | 5.0 |
| | II | | 0.5 | 1.0 | 1.0 | 1.0 | 1.0 | 1.0 | 1.0 | 1.0 | |
| Water soluble organic solvent | | 5.0 | 5.0 | 5.0 | 5.0 | 5.0 | 5.0 | 5.0 | 5.0 | 5.0 | 5.0 |
| Colorant | | 10.0 | 10.0 | 10.0 | 10.0 | 10.0 | 10.0 | 10.0 | 10.0 | 10.0 | 10.0 |
| Antiseptic mildew proofing agent | | 0.5 | 0.5 | 0.5 | 0.5 | 0.5 | 0.5 | 0.5 | 0.5 | 0.5 | 0.5 |
| Surfactant | A(Phosphoric aid ester) | | | 0.3 | | | | | | 0.3 | 0.3 |
| | B(Phosphoric aid ester) | | | | 0.3 | | | | | | |
| | C(Phosphoric aid ester) | | | | | 0.3 | | | | | |
| | D (Polyoxyethylene alkyl ether sulfuric acid salt) | | | | | | 0.3 | | | | |
| | E (Disulfonic acid salt) | | | | | | | 0.3 | | | |
| Water | | 54.5 | 57.0 | 58.2 | 58.2 | 58.2 | 58.5 | 58.2 | 58.2 | 59.2 | 59.2 |
| Total | | 100.0 | 100.0 | 100.0 | 100.0 | 100.0 | 100.0 | 100.0 | 100.0 | 100.0 | 100.0 |
| Viscosity under stress (20° C. mPa · s) | | | | | | | | | | | |
| Stress $\tau$ = 0.01 Pa | | 2100 | 1400 | 250 | 250 | 250 | 250 | 250 | 250 | 11100 | 25500 |
| Stress $\tau$ = 10 Pa | | 7.5 | 6.0 | 8.0 | 8.0 | 8.0 | 8.0 | 8.0 | 8.0 | 8.0 | 10.5 |
| Viscosity by E rotational viscometer | | 8.5 | 6.5 | 9.5 | 9.5 | 9.5 | 9.5 | 9.5 | 9.5 | 8.0 | 10.0 |

TABLE 3-continued (amount: wt %)

|  | Example |  |  |  |  |  |  |  |  |  |
|---|---|---|---|---|---|---|---|---|---|---|
|  | 14 | 15 | 16 | 17 | 18 | 19 | 20 | 21 | 22 | 23 |
| (20° C. mPa · s) Shear rate $D = 200_{s-1}$ (50 rpm) |  |  |  |  |  |  |  |  |  |  |
| T. I. Value | 1.6 | 1.4 | 1.5 | 1.5 | 1.5 | 1.5 | 1.5 | 1.5 | 1.8 | 2.5 |
| Thread density of central core(g/cm³) | 0.24 | 0.28 | 0.185 | 0.185 | 0.185 | 0.185 | 0.185 | 0.185 | 0.185 | 0.185 |
| Writing performance | ◎ | ○ | ◎ | ◎ | ◎ | ◎ | ○ | ○ | ◎ | ◎ |
| Storage stability | ○ | ○ | ○ | ○ | ○ | ○ | ○ | ○ | ○ | ◎ |
| Fixability | ◎ | ◎ | ◎ | ◎ | ◎ | ◎ | ◎ | ◎ | ○ | ◎ |
| Glittery with time | X | X | ◎ | ○ | ◎ | X | X | X | ◎ | ◎ |
| Inhibition of gas generation | X | X | ◎ | ○ | ◎ | X | X | X | ◎ | ◎ |

TABLE 4

(amount: wt %)

|  |  | Comparative Example |  |  |  |
|---|---|---|---|---|---|
|  |  | 5 | 6 | 7 | 8 |
| Aluminum pigment | I |  | 5.0 |  | 10.0 |
|  | II |  |  | 5.0 |  |
|  | III | 10.0 | 5.0 | 5.0 |  |
| Bonding resin | I | 10.0 | 10.0 | 10.0 | 10.0 |
|  | II | 5.0 | 5.0 | 5.0 | 5.0 |
| Thickening agent (Thixotropic) | I | 5.0 | 5.0 | 5.0 |  |
|  | II |  |  |  |  |
| Water soluble organic solvent |  | 5.0 | 5.0 | 5.0 | 5.0 |
| Colorant |  | 10.0 | 10.0 | 10.0 | 10.0 |
| Antiseptic mildew agent |  | 0.5 | 0.5 | 0.5 | 0.5 |
| Surfactant | A(Phosphoric acid ester) |  |  |  |  |
|  | B(Phosphoric acid ester) |  |  |  |  |
|  | C(Phosphoric acid ester) |  |  |  |  |
|  | D (Polyoxyethylene alkyl ether sulfuric acid salt) |  |  |  |  |
|  | E (Disulfonic acid salt) |  |  |  |  |
| Water |  | 54.5 | 54.5 | 54.5 | 59.5 |
| Total |  | 100.0 | 100.0 | 100.0 | 100.0 |
| Viscosity under stress (20° C. mPa · s) |  |  |  |  |  |
| Stress τ = 0.01 Pa |  | 2100 | 2100 | 2100 | 11.5 |
| Stress τ = 10 Pa |  | 7.5 | 7.5 | 7.5 | 3.5 |
| Viscosity by E-rotational viscometer (20° C. mPa · s) |  | 8.5 | 8.5 | 8.5 | 7.3 |
| T. I. Value |  | 1.6 | 1.6 | 1.6 | 1.2 |
| Thread density of central core(g/cm³) |  | 0.185 | 0.185 | 0.185 | 0.185 |
| Writing performance |  | X | X | X | ○ |
| Storage stability |  | X | X | X | X |
| Fixability |  | ○ | ○ | ○ | ○ |
| Glitter with time |  | X | X | X | X |
| Inhibition of gas generation |  | X | X | X | X |

In tables 2 to 4, compositions of each material is as follows.

(Aluminum Pigment)

I Trade name "Alpaste WXM0660", manufactured by Toyo Aluminium CO., LTD., median diameter=about 4.5 μm II Trade name "Alpaste WXM0630", manufactured by Toyo Aluminium CO., LTD., median diameter=about 7 μm III Trade name "Alpaste WXM5660", manufactured by Toyo Aluminium CO., LTD., median diameter=about 11.5 μm (Bonding Resin)

I Styrene acryl synthetic resin emulsion: trade name "JOHNCRYL1535" manufactured by Johnson Polymer Co II Styrene acryl alkali soluble resin: trade name "JOHNCRYL62" manufactured by Johnson Polymer Co III Vinyl acetate acrylic acid ester copolymer resin emulsion: trade name "Mowinyl DM-5" manufactured by Clariant Polymer Co (Thickening Agent or Thixotropic Agent)

I Polyacrylic acid: trade name "JULIMERAC-20L" manufactured by Nihon Junyaku Co., Ltd.

II Polyacrylic acid: trade name "MOWIPLA" manufactured by Clariant Polymer Co (Water Soluble Organic Solvent)

Ethylene glycol (reagent)

(Colorant)

Blue Pigment Dispersion Prepared by the Following Method

A pigment dispersion with average particle diameter of 0.08 μm and solid concentration of 10% by weight was obtained by adding NaOH to 5 parts by weight of phthalocyanine blue and 1 part by weight of styrene-acryl copolymer and dispersing, followed by dispersing with a ball mill.

(Antiseptic Mildew Proofing Agent)

1,2-Benzoisothiazolin-3-on (trade name "Proxell XL-2", manufactured by Apicia Synthesis Co., Ltd.)

(Surfactant)

A: Polyoxyalkyl phosphoric acid salt (HLB=14.9, monopolyoxyalkyl, Na salt, trade name "PLYSURF A-217E" manufactured by Daiichi Kogyo Seiyaku KK)

B: Polyoxyalkyl phosphoric acid salt (HLB=7.0, monopolyoxyalkyl, Na salt, trade name "PLYSURF A-208S" manufactured by Daiichi Kogyo Seiyaku KK)

C: Alkyl phosphoric acid salt (K salt, trade name "ELECTRO STRIPPER F" manufactured by Kao Corporation)

D: Polyoxyethylene alkyl ether sulfuric acid salt (trade name "EMAL20CM" manufactured by Kao Corporation)

E: Disulfonic acid salt (trade name "PEREX SS-H" manufactured by Kao Corporation)

(Evaluation)

Regarding water-based metallic ink composition obtained by Examples 4 to 23 and Comparative Examples 5 to 8, evaluation was made on writing performance, storage stability, fixability, glittering feeling after time passage and inhibiting degree of gas generation.

The result is shown in tables 2 to 4. For information, in evaluating writing performance, storage stability, fixability, and glittering feeling after time passage, test samples were prepared in which each water-based metallic ink composition in Examples 4 to 23 and Comparative Examples 5 to 8 was filled in a polyester fiber with thread density as shown in the table. For information, in Examples 4 to 15 and Comparative Examples 5 to 8, a felt pen tip was set and in Examples 16 to 23, an acryl fiber pen tip was set, and a pen capacity (ink retention amount of a central core) in each test sample was 6.0 g, and filling amount of an ink was 5.6 g.

(Test of Writing Performance)

The writing performance was evaluated based on the rating criteria as follows in which the test was conducted using a marking pen of a test sample regarding Examples and Comparative Examples under the condition of 50 g of loading, a writing angle of 65°, a writing speed of 7 cm/sec.

⊚: Writing of not less than 150 m is available.

○: Writing of not less than 100 m is available.

X: Writing of not less than 100 m is not available.

(Test of Storage Stability)

A marking pen of a test sample regarding Examples and Comparative Examples after storage for 1 month with a pen tip up, down, or horizontal at a temperature of 50° C., storage stability was evaluated based on the rating criteria as follows.

○: No gradation in a written mark occurs.

Δ: Some gradation in a written mark is noted but has no problem in practical use.

X: Gradation in a written mark is noted and has problems in practical use.

(Test of Fixability)

The fixability was evaluated based on the following criteria by writing on commercially available loose-leaf sheets with a marking pen of a test sample regarding Examples and Comparative Examples, drying, thereafter adhering commercially available adhesive cellophane tapes thereon, and then visually observing conditions after peeling off the tapes.

⊚: A written mark can be visually observed completely and there is no difference before and after tests.

○: A written mark can be visually observed, but some color difference occurs before and after tests though not affecting practical use.

X: No written mark can be visually observed.

(Glittering Feeling with Time Passage)

Right after the preparation of each test sample, water-based metallic ink composition of each Examples and Comparative Examples was coated on a non absorbent surface made of PET with a film thickness of 20 μm and after storage for 1 month at a temperature of 50° C., each sample was coated on a non absorbent surface made of PET with a film thickness of 20 μm and by comparing a written mark right after the preparation of each test sample with a written mark after 1 month at a temperature of 50° C. and visually observing the difference of a glittering feeling based on the following criteria.

(Evaluation Criteria)

⊚: No difference in glittering feeling is noted.

○: A little difference in glittering feeling is noted.

X: Remarkable difference in glittering feeling is noted.

(Degree of Inhibition of Gas Generation)

Water-based metallic ink composition obtained by Examples 4 to 23 and Comparative Examples of 5 to 8 was left at rest in a screw mouthed bottle made of a glass and situation of gas bubble generation in the ink was observed 24 hours after the preparation of each water-based metallic ink composition and evaluation was made based on the following criteria.

(Evaluation Criteria)

⊚: No gas generation was observed.

○: Some gas generation was observed.

X: Gas generation was easily observed.

(Result)

From tables 2 to 4, in the ink composition regarding Examples 4 to 21, writing performance, storage stability, and fixability was preferable. On the other hand, in the ink composition regarding Comparative Examples 5 to 7, since median diameter of a whole aluminum pigment contained therein exceeds 7 μm, it is impossible to write consecutively for not less than 100 m and in the sample after the test of storage stability, gradation in a written mark was observed.

Further, in the ink composition of Comparative Example 8, although writing performance is preferable, since it does not contain a thickening agent (thixotropic agent), a separated substance of an aluminum pigment becomes like a hard cake in the storage test and gradation was observed in a written mark.

Further, from table 3, it is recognized that although ink composition regarding Examples 12 to 15, writing performance, storage stability, and fixability are preferable, the preferable range of tread density of a central core is 0.150 to 0.240 g/cm$^3$.

Since the water-based metallic ink composition of Example 16 uses phosphoric acid ester surfactant with an HLB value of 14.9, a glittering feeling of a written mark and degree of gas inhibition were very good. Since the water-based metallic ink composition of Example 17 uses phosphoric acid ester surfactant with an HLB value of 7.0, a glittering feeling was preferable and regarding degree of gas inhibition, although some gas was generated, there was no problem in practical use. Since the water-based metallic ink composition of Example 18 uses phosphoric acid ester surfactant with an HLB value of 14.4, a glittering feeling of a written mark and a degree of gas inhibition were very good. On the other hand, since the water-based metallic ink composition of Example 19 does not use phosphoric acid ester surfactant, a glittering feeling of a written mark and a degree of gas inhibition were not good. Since the water-based metallic ink composition of Examples 20 and 21 uses polyoxyethylene alkyl ether sulfuric acid salt and disulfonic acid salt as a surfactant, a glittering feeling of a written mark and a degree of gas inhibition were not good.

Since the ink of the present invention is a water-based pigment-containing ink composition for central core type marking pens which comprises an aluminum pigment, a thickening agent (thixotropic agent), a bonding resin, a water-soluble organic solvent, and water, in which a median diameter of said aluminum pigment is not greater than 7 μm, clogging does not occur at a pen tip which is made up of a fiber bundle of an aluminum pigment, therefore the ink flow is preferable and a writing distance is long. Further, since the ink of the present invention is a water-based pigment-containing ink composition for central core type marking pens comprising an aluminum pigment, a thickening agent (thixotropic agent), a bonding resin, a water-soluble organic solvent, and water, wherein said thickening agent (thixotropic agent) is contained in 0.01 to 20% by weight with respect to the total amount of the ink composition, the viscosity at a rotation speed of 50 rpm is 3 to 12 mPa·s, and T.I. value (2.5 rpm/50 rpm) is not less than 1.2, due to the high viscosity of an ink when left to stand, separation of an aluminum can be inhibited, however, at a time of writing, due to the decrease in viscosity by a friction between a pen tip and a paper surface, the ink flow is preferable. Further, since the present invention relates to a water-based pigment-containing ink composition for central core type marking pens in which said ink is occluded in a central core with a thread density of 0.150 to 0.240 g/cm$^3$, further excellent ink flow and writing aptitude are shown. Further, in order to attain excellent storage stability, it is preferable that the pH value of an ink composition is adjusted to 6 to 9.

In addition, since an aluminum pigment separates in a conventional metallic ink, gradation in a written mark is liable to occur from an upper tip when an ink is filled in to a twin-type marking pen and let it stand. However, when the ink of the present invention is used, since the settlement of an aluminum pigment is inhibited, a written mark without gradation can be obtained from both tips even when an ink is filled in to a twin-type marking pen and let it stand.

In a water-based pigment-contained metallic ink for central core type marking pens of the present invention, by comprising a specific phosphoric ester surfactant, a written mark with a glittering feeling can be obtained after a passage of time without generation of hydrogen gas and good ink flow and long writing distance can be maintained even when used for a central core type marking pen in which an ink is maintained in a highly porous fiber bundle which is an ink storage portion.

INDUSTRIAL APPLICABILITY

As mentioned above, a water-based pigment containing ink composition of the present invention can preferably be used for a central core type marking pen since it can inhibit pigment separation in a central core even after a time passage when contained in a central core of a marking pen and color gradation does not occur at a time of writing and excellent in storage stability as well as in writing performance. In particular, a water-based metallic ink composition of the present invention comprising an aluminum pigment is most suitable for central core type marking pen capable of obtaining a written mark with a metallic tone.

The invention claimed is:

1. A central core type marking pen comprising an ink storage portion of a central core and a pen tip connected thereto, wherein said central core comprises a fiber bundle defining a porous capillary structure, and a metallic ink is contained in said capillary structure within said fiber bundle, said metallic ink comprising:

a pigment, said pigment comprising an aluminum pigment whose median diameter is not greater than 7 μm, and a thixotropic agent; comprising at least one selected from the group consisting of polyacrylic acid, polyacrylic acid alkali metal salt, polyacrylic acid organic amine salt and polyol, the pigment settling with time when standing, said metallic ink having a viscosity not less than 45 mPa*s when a stress is 0.01 Pa and a viscosity of not greater than 12 mPa*s when a stress is 10 Pa at a temperature of 20° C.

2. The central core type marking pen as set forth in claim 1, wherein said central core comprises a fiber bundle of polyester and said pen tip comprises an acrylic fiber bundle.

3. The central core type marking pen as set forth in claim 1, wherein a thread density of said central core is 0.150 to 0.240 g/cm$^3$.

4. The ventral core type marking pen as set forth in claim 1, wherein said pen tip comprises an acrylic fiber bundle, said metallic ink has a viscosity of 3 to 12 mPa*s at a rotation speed of 50 rpm and a T.I. value (2.5 rpm/50 rpm) of not less than 1.2, and the surface of said aluminum pigment has been treated with a water resistant a treatment, said metallic ink further comprising a colorant, a fixing resin, a water soluble organic solvent, and water.

5. A central core type marking pen comprising:
a pen holder body having an end opening portion,
a central core contained within said pen holder body,
an ink storage portion disposed within said central core, and
a pen tip connected to said ink storage portion,
said pen tip being held in a socket portion of said end opening portion of said pen holder body, wherein an air vent is created there between, and
a water-based metallic ink composition, comprising:
   a pigment comprising an aluminum pigment whose median diameter is not greater than 7 μm; and
   a thixotropic agent comprised of at least one compound selected from the group consisting of polyacrylic acid, polyacrylic acid alkali metal salt, polyacrylic acid organic amine salt, and polyol.

6. The central core type marking pen of claim 5, wherein the ink composition has a viscosity not less than 45 mPa*s when the stress is 0.01 Pa and not greater than 12 mPa*s when the stress is 10 Pa at a temperature of 20° C.

7. The central core type marking pen of claim 6 wherein the ink composition has a viscosity at a rotation speed of 50 rpm of 3 to 12 mPa*s and a T.I. value (2.5 rpm /50 rpm) of not less than 1.2.

8. The ventral core type marking pen as set forth in claim 5, wherein said central core includes a fiber structure, a thread density of said central core is 0.150 to 0.240 g/cm$^3$.

9. The central core type marking pen as set forth in claim 5, wherein the pH value of the water-based metallic ink composition is 6 to 9.

10. The central core type marking pen as set forth in claim 5, wherein said central core includes a fiber structure, said aluminum pigment that separates in the water-based metallic ink is re-dispersed inside cells of the fiber structure.

* * * * *